United States Patent [19]

Bosy

[11] Patent Number: 5,335,046
[45] Date of Patent: Aug. 2, 1994

[54] CLAMPING MECHANISM FOR USE ON A ROTATABLE PLOTTER DRUM

[75] Inventor: Brian Bosy, Framingham, Mass.

[73] Assignee: Intergraph Corporation, Huntsville, Ala.

[21] Appl. No.: 33,387

[22] Filed: Mar. 18, 1993

Related U.S. Application Data

[63] Continuation-in-part of Ser. No. 23,780, Feb. 22, 1993.

[51] Int. Cl.[5] .................. G03B 27/60; B41F 1/28; B41F 21/00; B41L 21/00
[52] U.S. Cl. .................................... 355/73; 101/415.1
[58] Field of Search .............. 101/116, 383, 415.1, 101/378, 385; 355/73, 104, 108, 110; 354/15

[56] References Cited

U.S. PATENT DOCUMENTS

| | | | |
|---|---|---|---|
| 4,596,188 | 6/1986 | Bonomi | 101/415.1 |
| 4,598,642 | 7/1986 | Saüer et al. | 101/415.1 |
| 5,076,166 | 12/1991 | Herold et al. | 101/415.1 |
| 5,243,379 | 9/1993 | Lein | 355/73 X |

*Primary Examiner*—Richard A. Wintercorn
*Attorney, Agent, or Firm*—Bromberg & Sunstein

[57] ABSTRACT

A mechanism for clamping a flexible metal printing plate to the circumferential surface of a rotatable plotter drum is provided. The clamping mechanism includes a mounting member affixed to the drum's surface. The mounting member has a passage aligned radially with respect to the drum. A slidable member extends through the passage and past the drum's axis of rotation. The slidable member has, at one end, a head and, at the other end, a weight. The clamp head is disposed further from the axis of rotation than the mounting member and adjacent the drum surface so as to permit clamping between the head and the drum surface. The slidable member is disposed so that its center of mass is opposite the drum's axis of rotation from the head. A mechanism, such as a compressed spring mounted between the weight and the mounting member, is provided for urging the slidable member so as to force the head towards the drum surface. An actuator having two modes is also provided. In the first mode, it forces the slidable member so as to move the head away from the drum surface and, in its second mode, it permits the head to be urged towards the drum surface by the urging means. The clamping mechanism is also provided with a mechanism for turning the slidable member, so that every time the actuator goes into the second mode the clamp head is turned 90° from the previous time the actuator went into the second mode.

20 Claims, 5 Drawing Sheets

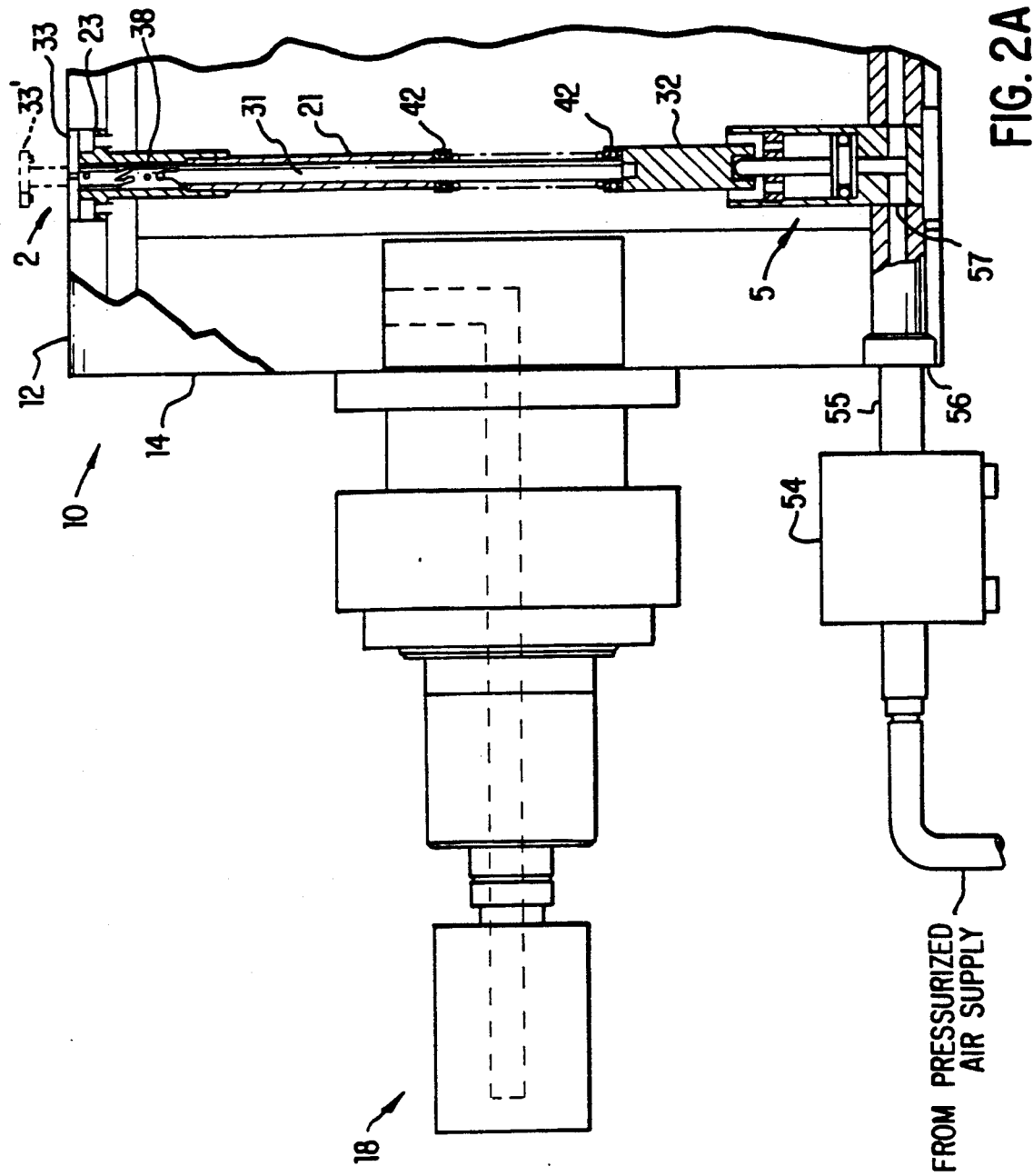

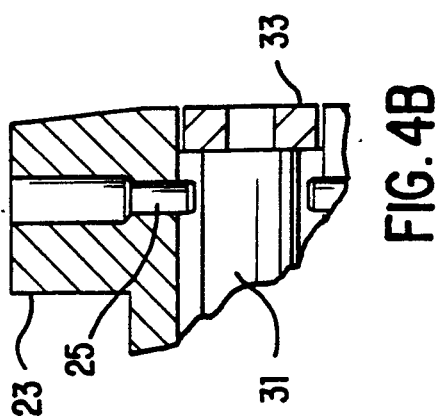
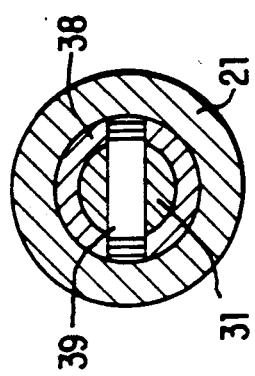
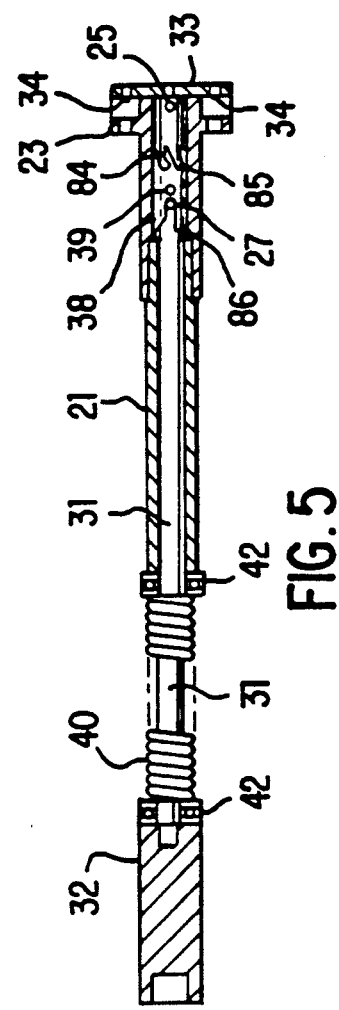
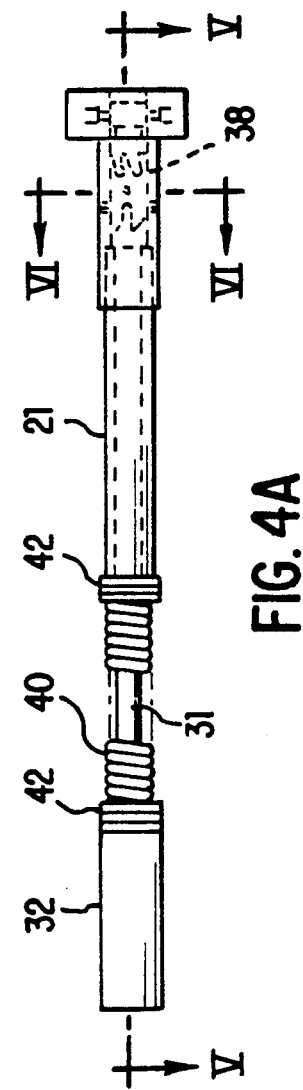

CLAMPING MECHANISM FOR USE ON A ROTATABLE PLOTTER DRUM

This application is a continuation in part of U.S. Pat. application Ser. No. 08/023,780, filed Feb. 22, 1993, for VACUUM DRUM FOR MOUNTING MEDIA OF DIFFERENT SIZES and bearing attorney docket number 1153/128 This application is hereby incorporated herein by reference.

TECHNICAL FIELD

This invention relates generally to clamping mechanisms, and particularly to mechanisms for holding flexible metal printing plates to the surface of a rotatable drum in a plotter.

SUMMARY OF THE INVENTION

The invention provides an easy-to-use and effective means of clamping a flexible metal printing plate to the circumferential surface of a plotter drum.

A clamping system in a preferred embodiment of the present invention includes a mounting member affixed to a rotatable drum. The mounting member has a passage aligned radially with respect to the drum. A slidable member extends through the passage and past the drum's axis of rotation. The slidable member has, at one end, a head and, at the other end, a weight. The clamp head is disposed further from the axis of rotation than the mounting member and adjacent the drum surface so as to permit clamping between the head and the drum surface. The slidable member is disposed so that its center of mass is opposite the drum's axis of rotation from the head.

In a preferred embodiment, the clamping system includes means for urging the slidable member so as to force the head towards the drum surface, such as a compressed spring mounted between the weight and the mounting member. An actuator having two modes is also preferably provided. In the first mode, it forces the slidable member so as to move the head away from the drum surface and, in its second mode, it permits the head to be urged towards the drum surface by the urging means. This actuator preferably includes a pneumatic piston mounted adjacent the weight.

An activation mechanism may be used to put the actuator into its first mode. The activation system may include an extendable nozzle or other extendable member, located adjacent the drum. In this embodiment, the extendable nozzle or member must be extended for the actuation means to go into its first mode. To engage the extendable member, the drum includes an end disk having a receptacle for the nozzle or other member. When the nozzle or member is extended and engaged by the receptacle, the drum is locked in position. In the preferred embodiment of the activation mechanism, the nozzle is connected to a pressurized air supply, and the receptacle is in fluid communication with the pneumatic piston, so that, when the nozzle is engaged by the receptacle, pressurized air is provided to the pneumatic piston, so as to put the actuation means into its first mode. In a preferred embodiment, the activation mechanism is used to cause several related clamping mechanisms to open at the same time.

Preferably, the clamp head has a finger, and the drum surface has a groove, into which the finger may be urged when the actuation means is in its second mode. The groove is preferably aligned in a direction parallel to the drum's axis of rotation.

The clamping system preferably includes means for causing the slidable member to turn so that, every other time the actuation means goes into its second mode, the finger does not go into the groove. This turning mechanism preferably includes a cylindrical cam component or components, located in the passage around the slidable member. This cam component or components has shaped notches. This turning mechanism includes a pin or pins, located in the passage adjacent the slidable member, where they can engage the notches as the actuation means switches between modes. The notches are shaped so that, as the pin or pins engage the notches, the slidable member is turned. The activation or turning mechanisms described herein may be used with different clamping mechanisms.

BRIEF DESCRIPTION OF THE DRAWINGS

FIG. 2A shows a longitudinal cross-section of a portion of a drum using a clamping mechanism.

FIG. 4A shows a clamping mechanism.

FIG. 4B shows a cross-sectional detail of FIG. 4B.

FIG. 5 shows a longitudinal cross-section of the clamping mechanism shown in FIG. 4A.

FIG. 6 shows an axial cross-section of the clamping mechanism shown in FIG. 4A.

DESCRIPTION OF SPECIFIC EMBODIMENTS

Figure 1A:
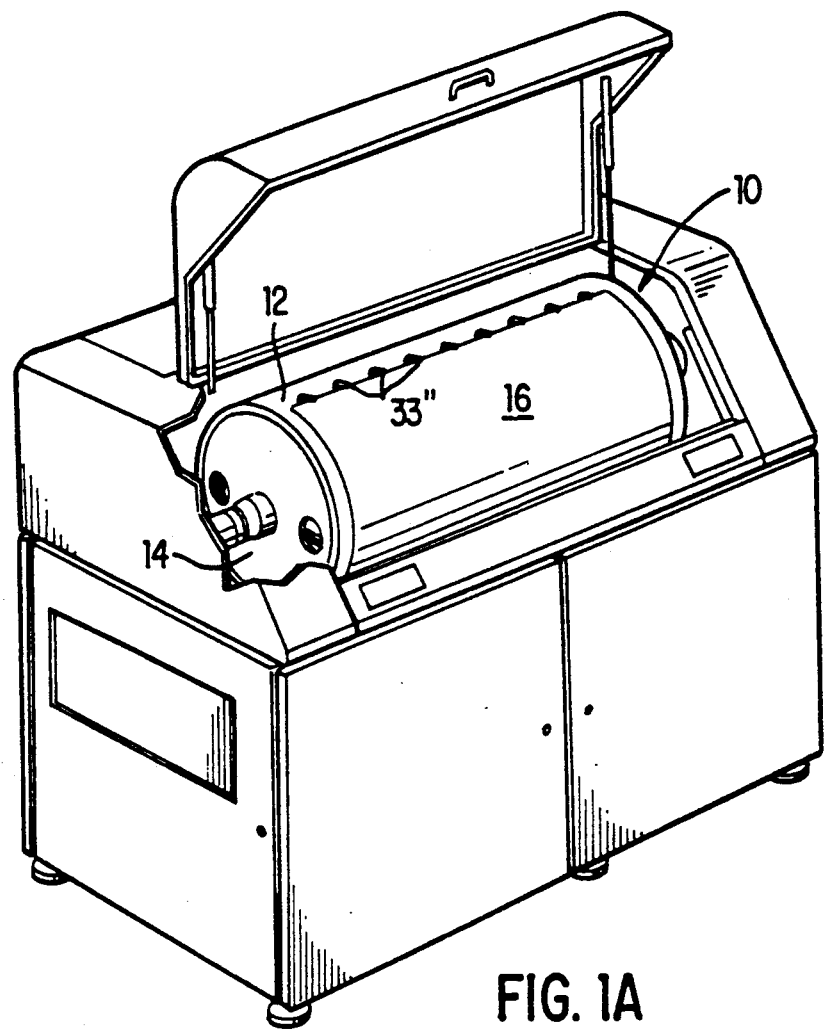
FIG. 1A shows a plotter, a portion of which is cut away to show a rotatable drum, on which a flexible metal printing plate is mounted.

FIG. 1A shows a plotter, which includes a rotatable drum 10. Typical prior-art plotters plot on paper or film, such as mylar film, and frequently use a laser beam to expose the desired portions of the film. The exposed film is usually used to prepare a printing plate for printing. In the present plotter, specially treated, flexible printing plates 16 can be mounted onto the surface 12 of the drum 10, so that the plate can be prepared for printing without the intermediate steps involving film.

The plate-clamping mechanisms described herein are capable of being stowed flush with drum's circumferential surface 12, so that they do not interfere with the mounting of regular film to the drum surface 12. FIG. 1C shows the head 33 of the clamping mechanism in the stowed position. In this position, the clamp head 33 is stowed in a groove 24 in the clamping mechanism's attachment collar 23, so that the clamping head 33 and the attachment collar 23 are flush with the drum surface 12.

Figure 1B:
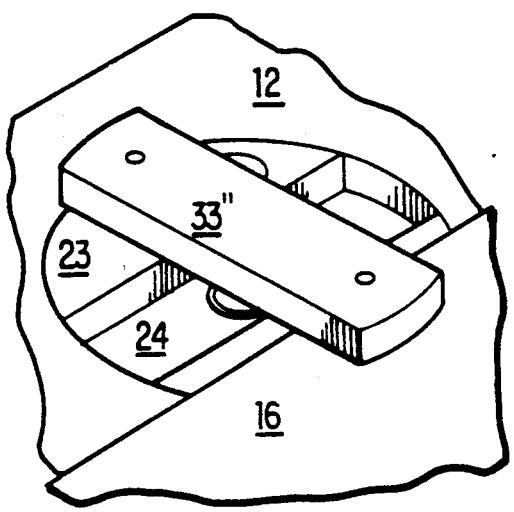
FIG. 1B is a detail of FIG. 1A, showing the clamping-mechanism head in the engaged position.
Figure 1C:
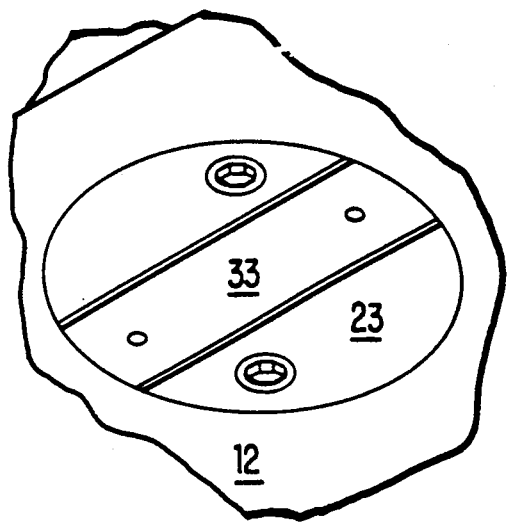
FIG. 1C shows the clamping-mechanism head in the stowed position.

FIG. 1B shows the clamping mechanism in the clamping position. In this position, the clamping head 33" is turned 90° from its stowed position (thereby exposing the groove 24), so that one of the head's fingers extends over the plate 16 in order to clamp the plate 16 to the drum surface 12.

FIG. 1A shows a line of clamping heads 33″ gripping the leading edge of the plate 16. Additional clamps (not shown and not necessarily as many as the visible clamping heads 33″) are located at the plate's trailing edge. Several sets of trailing-edge clamping mechanisms may be provided, so that the drum 10 may accommodate plates of different sizes.

In addition to the clamping mechanisms, the drum 10 may also be provided with vacuum grooves, in order to provide a vacuum to the drum surface 12 under the plate 16 (or film). The vacuum systems disclosed in application Ser. No. 08/023,780 for VACUUM DRUM FOR MOUNTING MEDIA OF DIFFERENT SIZES, referenced hereinabove, may be used in the drum 10 in conjunction with the clamping mechanisms described herein. It has been found that the clamping mechanisms hold the plate 16 to the drum surface 12 sufficiently well by themselves. Although providing a vacuum is not necessary to hold the plate, a vacuum system can, nevertheless, provide additional holding force and help ensure the plate 16 is held tightly to the drum surface 12, and a vacuum system is usually necessary to hold film properly to the drum surface 12. By providing registration pins and a vacuum system, in addition to the clamping mechanisms, the drum 10 can be used for plotting on film, as well as plates.

FIG. 2A shows a cross section of a drum 10 having a clamping mechanism 2 mounted therein. Attached to the shaft of the drum 10 are various components 18 (well known in the art) for causing the drum 10 to rotate and to measure the drum's rotation. (The shaft at the other end of the drum 10, which is not shown, may be used to provide a vacuum to the drum's interior for the vacuum system.).

Figures 2B, 3:
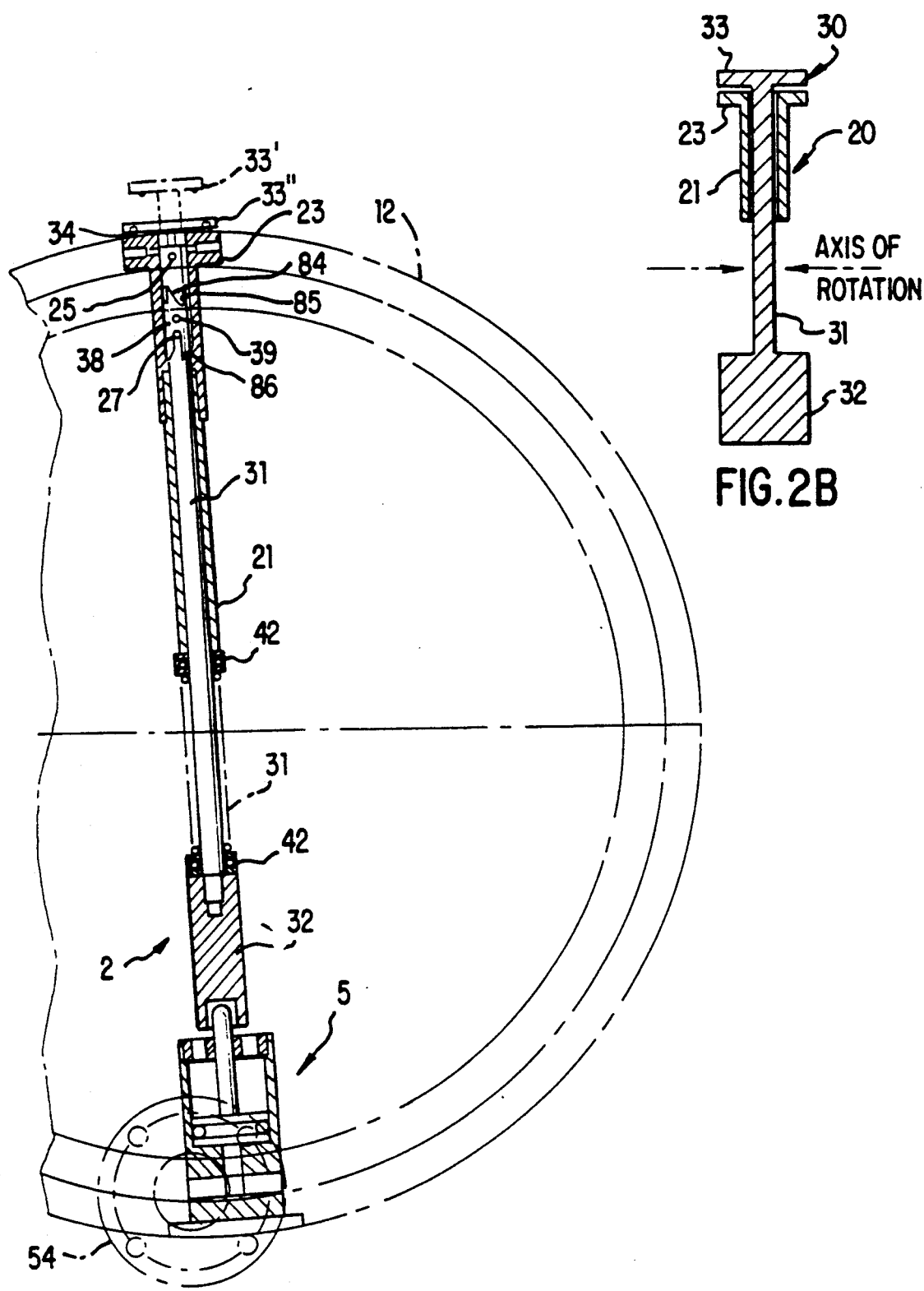
FIG. 2B is a schematic representation of the clamping mechanism shown in the drum in FIG. 2A.
FIG. 3 shows an axial cross-section of the drum shown in FIG. 2A.

FIG. 3 shows a different cross-section of the drum 10 shown in FIG. 2A. A portion of the clamping mechanism 2 does not move with respect to the drum 10, whereas another portion of the clamping mechanism 2 can slide along a diameter of the drum 10. FIG. 2B shows a simple schematic of these two portions of the clamping mechanism 2. The portion 20 that does not move with respect to the drum 10 includes the sleeve 21 and the attachment collar 23, which is used to mount the clamping mechanism 2 to the drum 10. The attachment collar 23 forms a portion of the drum surface 12, and the attachment collar's top face is slightly curved (as is apparent from FIG. 3) so that it conforms with the drum surface 12. The attachment collar 23 and the sleeve 12 define a passage.

This non-movable portion 20 can, in an alternative embodiment, simply be formed as a non-detachable portion of the drum 10. However, it is preferred that this portion 20 be easily detachable, so as to permit the easy removal of the whole clamping mechanism 2. By unscrewing the two hex nuts in the attachment collar 23 shown in FIG. 1C, the clamping mechanism 2 is detached from the drum 10 and may be easily removed from the drum and replaced.

The portion 30 that does move with respect to the drum 10 includes the clamp head 33, the rod 31, to which the head 33 is affixed and which passes through the passage in the non-movable portion 20, and the weight 32, which is affixed to the opposite end of the rod 31 from the head 33. Like the attachment collar 23, the top face of the clamp head 33 is also slightly curved so that it conforms with the drum surface 12, when it is in the stowed position (as shown in FIG. 1C).

This movable portion 30 is balanced about the drum's axis of rotation so that the movable portion's center of mass is opposite the axis of rotation from the clamp head 33. Thus, as the drum 10 rotates, the clamp head 33 is forced against drum's surface 12 (i.e., the attachment collar 23).

In order to provide sufficient clamping force when the drum is rotating slowly and when the drum is not rotating, as well as providing additional clamping force when the drum is rotating quickly, a compressed spring 40—shown in FIGS. 4A and 5—is placed between the sleeve 21 and the weight 32. Thus, the clamping force includes the force generated by the spring 40, plus the centrifugal force caused during rotation, and thus, the clamping force increases as the speed of rotation increases.

Ball bearings 42 are placed at either end of the spring 40 in order to prevent so much torsion from building up in the spring 40 that it affects the proper turning of the clamp head 33, as discussed below.

Instead of using a compressed spring 40 mounted around the rod 31 and between the weight 32 and the sleeve 21, other means may be employed to urge the clamp head 33 towards the attachment collar 23. For instance, a stretched spring may be attached to the clamp head 33 and the non-movable portion 20. Alternatively, a stretched spring may be attached to the weight 32 and the side of the drum 10 near the actuator 5. The advantage of the arrangement shown in the figures is that it is relatively easy to manufacture and it permits the easy removal of the clamping mechanism 2.

In order to mount a plate, the clamp head 33 is first forced away from the drum surface 12 into the open position 33′ as shown in phantom in FIGS. 2A and 3. In order to overcome the force of the spring 40 and open the clamp head, an actuator 5 is provided in the drum. In the preferred embodiment, the actuator includes a pneumatic piston assembly, such as that shown in FIG. 9. The pneumatic piston assembly includes a housing 52 and a piston 50. The upper end of the piston 50 protrudes into a cavity in the lower end of the weight 32. When pressurized air is supplied to the interior of the housing 52, the piston 50 is forced upward, forcing the movable portion 30 of the clamping mechanism upward 2. The clamp head 33′ is thus moved away from the attachment collar 23. To lower the clamp head 33′ the interior of the piston housing 52 is shut-off from the pressurized air supply and is vented to atmosphere, allowing the force of the compressed spring 40 to force the clamp head down towards the attachment collar 23.

Figure 9:
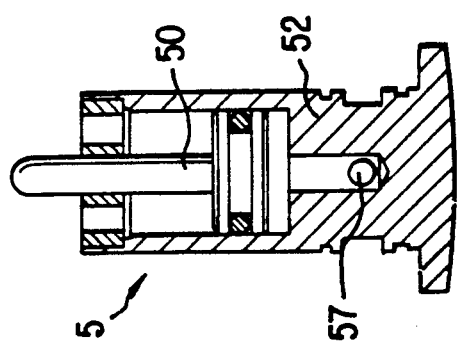
FIG. 9 shows a pneumatic piston used to open the clamping mechanism.

As can be seen in FIGS. 3 and 9, the bottom of the pneumatic piston assembly 5 is slightly curved so as to conform with the drum surface 12—like the top of the attachment collar 23. By locating the piston assembly 5 at the drum surface 12, the piston assembly 5 can also mounted so that it can be easily removed and replaced.

A pneumatic activator 54, mounted adjacent the drum 10, is used to provide pressurized air to the pneumatic piston assembly 5. This activator 54 has an extendable nozzle 55, that extends when pressurized air is provided to the activator 54. The end disk 14 of the drum 10 has a receptacle 56 for receiving the extendable nozzle 55. In order for the nozzle 55 to engage the receptacle 56, the drum 10 must be in the correct orientation-namely, that the clamp head 33 that is to be opened is on the top of the drum 10 (and the actuator 5 on the bottom). By putting the clamp head 33 on the top of the drum during loading and unloading, it is more accessible to the operator of the plotter. When the receptacle 56 is in the correct position and is engaged by the extendable nozzle 55, the drum 10 is locked in position. Once the extendable nozzle 55 and the receptacle 56 are engaged, pressurized air is provided from the receptacle 56 to the inlet 57 in the piston housing 52, and the clamp head 33 is forced up.

Several clamping mechanisms 2 may be arranged in a row for clamping the same edge—leading or trailing—of the plate 16, as shown in FIG. 1A. In order to have all the clamp heads 33" shown in FIG. 1A open at the same time, the pneumatic piston assembly 5 associated with each clamp head is put in fluid communication with the same receptacle Another receptacle 56 may be provided for all the clamping mechanisms 2 for the trailing edge. An additional receptacle 56 may be provided for each set of clamping mechanisms 2 that may be provided for the trailing edges of differently sized plate.

Other types of actuation systems may be used instead of pneumatic pistons. For example, an electromagnetic solenoid may be used to push the weight 32 towards the sleeve 21. In such a system, electric current may be provided to the solenoid or set of solenoids through a receptacle on the drum's end disk 14. An extendable member capable of providing electric current may be mounted adjacent the drum's end disk, so that when the drum is in the proper position for loading or unloading, the member may extend and engage the receptacle. Once engaged, the extendable member provides current to the receptacle, which in turn provides current to the solenoids connected thereto, which then forces the weights towards their respective sleeves. The solenoids must, of course, be powerful enough to overcome the force of the spring 42.

To mount a plate 16, the operator rotates the drum 10 so that the clamp heads 33 for the plate's leading edge are on top. (Of course, the plotter may be designed so that the clamp heads may be actuated in any position that is convenient for loading the plate 16.) The operator then flips a switch or pushes a button to put the leading-edge clamp heads 33' into the open position. This action locks the drum 10 into position. The operator then inserts the leading edge of the plate 16 between the fingers of the opened clamp heads 33' and the drum surface 12, and then causes the clamp heads to come down and clamp the leading edge of the plate 16. The plate's leading edge is then grasped between the hardened spurs (or indentors) 34 of the clamp head 33" and the attachment collar 23, and the drum 10 is unlocked and free to rotate. (The use of hardened spurs 34, instead of curving the bottom of the clamp head 33 to correspond to the top of the attachment collar 23, is preferred for holding the plate 16, since the spur 34 concentrates the pressure being applied by the clamping mechanism 2 and holds the plate 16 more securely than a substantially flat underside of the clamp head 33, even if the underside is roughened. It is also preferred to place the spurs 34 on the clamp head 33 instead of the attachment collar 23, in order to avoid interfering with the mounting of film. In the embodiment shown in the figures, the spurs 34 are hidden when the clamp head is in its stowed position 33.)

The operator then turns the drum 10 so that the appropriate set of trailing-edge clamp heads 33 are on top. The operator then causes the drum 10 to lock in position and the trailing-edge clamp heads to open up. The trailing edge of the plate 16 is then inserted between the clamp heads' fingers and the drum surface 12. The trailing-edge clamp heads are then caused to come down and clamp the trailing edge of the plate. (Of course, the trailing edge may be clamped first, then the drum rotated in the opposite direction so that the leading edge may be clamped.) As in mounting film on plotting drums, registration pins may be used to ensure the proper alignment of the plate on the drum surface 12. In addition, an automatic loading system may be used to feed and mount the flexible plates 16 automatically.

Figure 7:
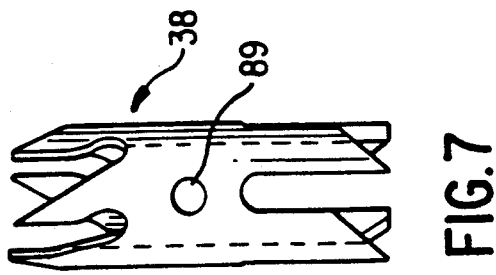
FIG. 7 shows the cylindrical cam member used in the clamping mechanism shown in FIGS. 4A and 5.

In order to turn the clamp head from its stowed position 33 to its clamping position 33", a cylindrical cam member 38 is affixed to and around the rod 31 and two pairs of pins 25 and 27 are affixed to the sleeve 21 in the passage. Such a cam member 38 is shown in FIG. 5 and in phantom in FIG. 4a. The cam member 38 has four notches on its top and four notches on its bottom. (The bottom of the top notches form the open-mode seats 85, and the apex of the bottom notches form the closed-mode seats 87. The term "closed mode" refers to either the stowed mode 33 or the clamping mode 33" of the clamp head, i.e. whenever the clamp head 33 is forced towards the drum 10.) The cam 38 is attached to the rod 31 by means of a pin 39 (shown in FIGS. 5 and 6) that passes through the rod 31 and apertures 89 (shown in FIGS. 7 and 8) in the cam 38.

As the weight 32 is pushed towards the sleeve 21 by the actuator 5, the rod 31 and the cam 38 move to the right in FIGS. 4A and 5, and approach the open-mode (or front-stroke) pins 25 (which can be seen in FIGS. 4B and 5). The two open-mode pins 25 are located the same distance away from the drum's axis of rotation on opposite sides of the passage through the sleeve 21. (Only one of the open-mode pins 25 and only one of the closed mode pins 27 are necessary for the turning mechanism to work properly; providing two of each reduces the stress on each pin and, of course, provides a margin against failure.) When the cam 38 comes into contact with the open-mode pins 25, the pins 25 press against the cam's front-stroke slopes 84 (see FIG. 8) causing the cam 38 and the rod 31 to turn. The rod 31 turns until the open-mode pins 25 are seated in the open-mode seats 85 at the bottom of the slopes 84. Thus, with the cam 38 shown in FIGS. 5, 7 and 9, the rod 31 and the cam head 33 turn 60° during the front stroke, i.e., as the cam head goes from the stowed position 33 or the clamped position 33" to the open position 33'.

Figure 8:
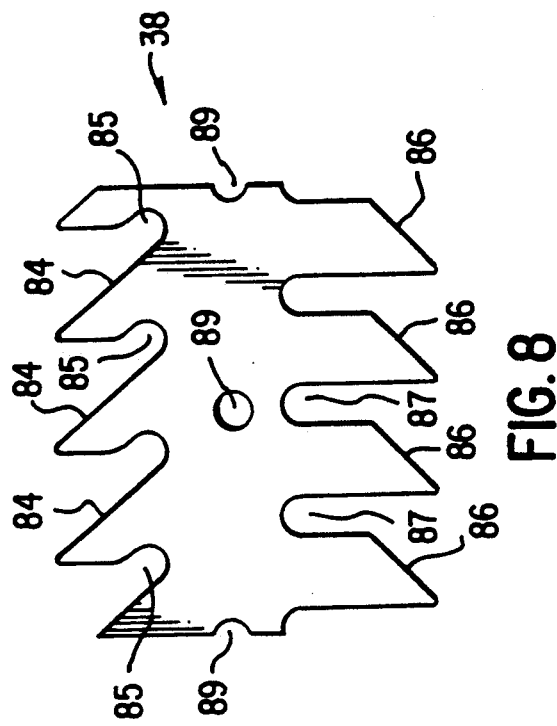
FIG. 8 depicts the cylindrical cam member shown in FIG. 7 flattened out.

When pressurized air is shut-off from the actuator 5, the spring 40 pushes the weight 32 away from the sleeve 21, and the cam 38 moves towards the closed-mode (or back stroke) pins 27. Like the open-mode pins, the two closed-mode pins 27 are located the same distance away from the drum's axis of rotation (which is less than the distance for the open-mode pins 25) on opposite sides of the passage through the sleeve 21. When the cam 38 comes into contact with the closed-mode pins 27, the pins 27 press against the cam's back-stroke slopes 86 (see FIG. 8) causing the cam 38 and the rod 31 to turn further. The rod 31 turns until the closed-mode pins 27 are seated in the closed-mode seats 87 at the top of the slopes 86 as shown in FIG. 8. Thus, with the cam 38 shown in FIGS. 5, 7 and 9, the rod 31 and the cam head 33' turn 30° during the back stroke, i.e., as the cam head goes from the open position 33' to the stowed position 33 or the clamped position 33". Thus, through a complete cycle of one front stroke and one back stroke, the cam head 33 turns 90°. After two complete cycles—front stroke, back stroke, front stoke, back stroke—the cam head 33 returns to the same mode. For example, if it starts off in the stowed mode 33, it goes into the open mode 33' then the clamped mode 33", then the open mode again 33', and finally back to the stowed mode 33.

The closed-mode seats 87 are set deep into the bottom notches, in order to prevent the hardened spurs 34 from being dragged across the plate 16 during the back stroke and scratch the plate 16. Furthermore, when the clamp head 33" is holding a plate 16, the clamp head is prevented from coming as close to the drum's axis of rotation as when it is stowed in the groove 24. Thus, the closed-mode pins 27 do not go as far into the cam's bottom notches in the clamping mode as in the stowed mode. Since it is desired to keep the cam heads 33" from twisting while a plate 16 is being clamped, the bottom notches should be narrow at the point where the closed-mode pins 27 rest during the clamping mode.

The seat 85 of each the cam's top notches is placed partially under the slope 84 of the notch to its right (as seen in FIG. 8). This arrangement causes the rod 31 to turn a small bit extra during each front stroke, and helps ensure that the closed-mode pin 27 engages the correct lower slope 86 during the subsequent back stroke. During the subsequent back stroke, the rod 31 turns in the opposite direction a small amount before a lower slope 86 is engaged by the closed mode pin 27 and the 90° turn of the clamp head 33 is completed.

In the cam member 38 shown in FIGS. 2A and 3, the seats 85 of the upper notches do not go under the slope 84 of the next notch. This cam 38 performs the same way as the cam shown in FIGS. 4A, 5, 7 and 8, except the closed-mode pin 27 of the clamping mechanism 2 shown in FIGS. 2A and 3 may be less likely to engage the correct lower slope 86 during the back stroke.

Other types of cam and pin arrangements may be used to cause the rod 31 to rotate, although it is believed that the arrangement just described is the simpler to manufacture than any of these alternatives. One alternative cam-and-pin arrangement has a cylindrical cam affixed to the inside of the sleeve 21 and open-mode and closed-mode pins affixed to the rod 31—reversing the arrangement depicted in the drawings. Other aspects of this alternative arrangement are also reversed from the depicted arrangement: the cam's front-stroke slopes are closer to drum's axis of rotation, and its back-stroke slopes are further from this axis; the rod's open-mode pins (the pins that are seated during the open mode) are closer to this axis, and the closed-mode pins (which are seated during the closed mode) further from this axis. Another arrangement has the cylindrical cam member divided into two portions and uses only one pair of pins for seating in the notches of the cam member. The cam member portions can be affixed to either the sleeve 21 or the rod 31, while the pins are attached to whichever is not affixed to the cam portions. In either of these two arrangements, the pins are located between the two portions of the cam member and the notches on each of the cam portions face each other and the pins. As the clamp head 33 is forced away from the drum surface 12 by the actuator 5 or is permitted to be urged towards the drum surface 12 by the spring 40, the pins come into contact with the slopes of the notches on one of the cam member portions, causing the rod 31 to turn.

Terms such as "bottom", "top", "upper", "lower", "right" and "left" are used herein to help explain aspects of the devices with reference to the figures. These terms are not meant imply that the devices can only work properly in certain orientations or in certain directions. It will be apparent to one of ordinary skill in the art that the drum 10 can operate in a variety of orientations, that the clamping mechanisms 2 assume many different orientations as the drum rotates, and that the cam member 38 can be configured to cause rotation of the cam head 33 in either direction.

Although the invention has been described with reference to several preferred embodiments, it will be understood by one of ordinary skill in the art that various modifications can be made without departing from the spirit and the scope of the invention, as set forth in the claims hereinbelow.

What is claimed is:

1. A clamping system for use in a rotatable drum, the clamping system comprising:
    a mounting member affixed to the drum, the mounting member having a passage aligned radially with respect to the drum; and
    a slidable member extending through the passage and past the drum's axis of rotation, the slidable member including, at one end, a head, which is disposed further from the axis of rotation than the mounting member and adjacent the drum surface so as to permit clamping between the head and the drum surface, and, at the other end, a weight, which is disposed so that the slidable member's center of mass is opposite the drum's axis of rotation from the head.

2. A clamping system according to claim 1, further including means for urging the slidable member so as to force the head towards the drum surface.

3. A clamping system according to claim 2, wherein the urging means includes a compressed spring mounted between the weight and the mounting member.

4. A clamping system according to claim 2, further including actuation means for, in a first mode, forcing the slidable member so as to move the head away from the drum surface and, in a second mode, permitting the head to be urged towards the drum surface by the urging means.

5. A clamping system according to claim 4, wherein the head has a finger, and the drum surface has a groove, into which the finger may be urged when the actuation means is in its second mode; the clamping system further including means for causing the slidable member to turn so that, every other time the actuation means goes into its second mode, the finger does not go into the groove.

6. A clamping system according to claim 5, wherein the groove is aligned in an axial direction.

7. A clamping system according to claim 5, wherein the turning means includes
    cylindrical cam means, located in the passage around the slidable member, for providing shaped notches; and
    pin means, located in the passage adjacent the slidable member, for engaging the notches as the actuation means switches between modes;
    wherein the notches are shaped so that, as the pin means engages the notches, the slidable member is turned.

8. A clamping system according to claim 5, wherein the turning means includes first and second pins affixed to the mounting member in the passage at different distances from the drum's axis of rotation; and a cylindrical cam affixed around the slidable member between the first and second pins, the cylindrical cam having notches at both of its ends, so that, as the actuation means switches between modes, one of the first and second pins becomes seated in one of the notches on the cylindrical cam, the notches being shaped so that, as one of the first and second pins becomes seated in one of the notches, the slidable member is turned.

9. A clamping system according to claim 4, wherein the actuation means includes a pneumatic piston mounted adjacent the weight.

10. A clamping system according to claim 9, wherein the actuation means further includes an extendable nozzle, located adjacent the drum, that is extended when the actuation means is in its first mode, and wherein the drum includes an end disk having a receptacle for the nozzle, so that, when the nozzle is extended and engaged by the receptacle, the drum is locked in position, the nozzle being connected to a pressurized air supply, and the receptacle being in fluid communication with the pneumatic piston, so that, when the nozzle is engaged by the receptacle, pressurized air is provided to the pneumatic piston, so as to put the actuation means into its first mode.

11. A clamping system according to claim 10, wherein the head has a finger, and the drum surface has a groove, into which the finger may be urged when the actuation means is in its second mode; the clamping system further including means for causing the slidable member to turn so that, every other time the actuation means goes into its second mode, the finger does not go into the groove.

12. A clamping system according to claim 11, wherein the turning means includes cylindrical cam means, located in the passage around the slidable member, for providing shaped notches; and pin means, located in the passage adjacent the slidable member, for engaging the notches as the actuation means switches between modes;

wherein the notches are shaped so that, as the pin means engages the notches, the slidable member is turned.

13. A system for plotting on a medium, the system comprising:

a rotatable drum having a circumferential surface and an end disk having a receptacle;

clamping means for holding the medium to the drum surface, the clamping means having an open mode, in which the medium may be mounted on the drum, and a clamped mode, in which the medium is clamped to the drum surface; and activation means, mounted adjacent the end disk, for urging the clamping means into its open mode, the activation means having an extendable member, disposed so that, when the member is extended and engaged by the receptacle, the drum is locked in position.

14. A system according to claim 13, wherein the clamping means includes a pneumatic piston, wherein the extendable member includes an extendable nozzle, the nozzle being connected to a pressurized air supply, and wherein the receptacle is in fluid communication with the pneumatic piston, so that, when the nozzle is engaged by the receptacle, pressurized air is provided to the pneumatic piston, so as to put the clamping means into its open mode.

15. A system according to claim 13, further including second clamping means for holding the medium to the drum surface, the second clamping means having an open mode, in which the medium may be mounted on the drum, and a clamped mode, in which the medium is clamped to the drum surface; and wherein the activation means urges the second clamping means into its open mode at the same time the first clamping means is forced into its open mode.

16. A system according to claim 15, wherein each of the clamping means include a pneumatic piston, wherein the extendable member includes an extendable nozzle, the nozzle being connected to a pressurized air supply, and wherein the receptacle is in fluid communication with the pneumatic pistons, so that, when the nozzle is engaged by the receptacle, pressurized air is provided to the pneumatic pistons, so as to put both clamping means into the open mode.

17. A clamping system comprising:

a mounting member having a mounting surface and a passage, the mounting surface having a groove;

a slidable member extending through the passage, the slidable member including, at one end, a finger, which is disposed adjacent the mounting surface so as to permit clamping between the finger and the surface;

means for urging the slidable member so as to force the finger towards the drum surface;

actuation means, for, in a first mode, forcing the slidable member so as to move the finger away from the mounting surface and, in a second mode, permitting the finger to be urged against the mounting surface by the urging means; and means for causing the slidable member to turn so that, every other time the actuation means goes into its second mode, the finger does not go into the groove, and the remaining times the actuation means goes into its second mode, the finger is urged into the groove, the turning means including cylindrical cam means, located in the passage around the slidable member, for providing shaped notches, and pin means, located in the passage adjacent the slidable member, for engaging the notches as the actuation means switches between modes, wherein the notches are shaped so that, as the pin means engages the notches, the slidable member is turned.

18. A clamping system according to claim 17, wherein the pin means includes first and second pins affixed to the mounting member at different points along the length of the passage, and the cam means includes a cylindrical cam affixed around the slidable member between the first and second pins, the cylindrical cam having notches at both of its ends, so that, as the actuation means switches between modes, one of the first and second pins becomes seated in one of the notches on the cylindrical cam, the notches being shaped so that, as one of the first and second pins becomes seated in one of the notches, the slidable member is turned.

19. A clamping system according to claim 17, for use on a rotatable drum having an end disk and a circumferential surface, wherein the circumferential surface of the drum forms the mounting surface, the clamping system further including activation means, mounted adjacent the end disk, for causing the actuation means to go into its open mode, the activation means having an extendable member, disposed so that, when the member is extended and engaged by a receptacle on the end disk, the drum is locked in position.

20. A system according to claim 19, wherein the actuation means includes a pneumatic piston, wherein the extendable member includes an extendable nozzle, the nozzle being connected to a pressurized air supply, and wherein the receptacle is in fluid communication with the pneumatic piston, so that, when the nozzle is engaged by the receptacle, pressurized air is provided to the pneumatic piston, so as to put the actuation means into its first mode.

* * * * *